United States Patent [19]

Masuda

[11] Patent Number: 4,549,180

[45] Date of Patent: Oct. 22, 1985

[54] PROCESS VARIABLE TRANSMITTER

[75] Inventor: Hisaki Masuda, Fuchu, Japan

[73] Assignee: Tokyo Shibaura Denki Kabushiki Kaisha, Kawasaki, Japan

[21] Appl. No.: 408,047

[22] Filed: Aug. 13, 1982

[30] Foreign Application Priority Data

Aug. 13, 1981 [JP] Japan .................................. 56-127158

[51] Int. Cl.$^4$ .............................................. H04Q 9/00
[52] U.S. Cl. ........................... 340/870.04; 340/870.13; 340/870.39; 364/172
[58] Field of Search ...................... 340/870.04, 870.13, 340/870.39; 364/138, 139, 152, 172, 563, 571; 370/100

[56] References Cited

U.S. PATENT DOCUMENTS

| | | | |
|---|---|---|---|
| 3,070,301 | 12/1962 | Sarnoff | 364/152 |
| 3,310,663 | 3/1967 | Bouman | 364/172 |
| 3,824,574 | 7/1974 | Ironside | 364/172 |
| 4,053,714 | 10/1977 | Long | 340/870.13 |
| 4,204,249 | 5/1980 | Dye | 364/200 |
| 4,296,464 | 10/1981 | Woods | 364/200 |
| 4,438,499 | 3/1984 | Jensen | 364/172 |

Primary Examiner—John W. Caldwell, Sr.
Assistant Examiner—Michael F. Heim
Attorney, Agent, or Firm—Oblon, Fisher, Spivak, McClelland & Maier

[57] ABSTRACT

A process variable transmitter including a plurality of process variable detector units for detecting a primary process variable to be measured and secondary process variables not to be measured but which affect the primary process variable, a memory circuit for storing detected outputs supplied from the process variable detector units, a circuit for reading the detected outputs out of the memory circuit and then correcting the detected output indicative of the primary process variable based on the detected outputs indicative of the secondary process variables, and a power supply control for intermittently supplying electric power to the process variable detector units and the correcting circuit. The process variable transmitter corrects the primary process variable to precision and consumes a reduced amount of electric power.

7 Claims, 4 Drawing Figures

4,549,180

PROCESS VARIABLE TRANSMITTER

BACKGROUND OF THE INVENTION

1. Field of the Invention

This invention relates to a process variable transmitter, for example such as a two-wire differential-pressure transmitter, and more particularly to a process variable transmitter capable of correcting a process variable to be measured, with reduced electric power consumption.

2. Description of the Prior Art

There are known a variety of process variable transmitters. One such conventional process variable transmitter is a differential-pressure transmitter for detecting a signal indicative of a differential pressure as a process variable to be detected and for transmitting such a signal to a certain location. The differential-pressure signal produced by a differential-pressure sensor is influenced by unmeasured secondary process variables such as temperature and static pressure, and hence is relatively unreliable for the standpoint of accuracy. Transmitters used in laboratories are designed to take the above influences into account. Thus, unmeasured secondary process variables such as temperature and static pressure are detected and then a differential-pressure signal is corrected on the basis of such detected process variables for gaining an accurate measured value.

More specifically, a prior process variable transmitting arrangement includes a differential-pressure transmitter installed on a pressure pipe for detecting a process variable to be measured, and temperature and pressure transmitters mounted on the pressure pipe. Process-variable signals from these transmitters are delivered to a receiving instrument, in which the output signal from the differential-pressure transmitter is corrected.

Where such a correcting means is incorporated in a two-wire transmitter, the following difficulties arise: two-wire transmitters are normally required to operate at 24 V with an electric current ranging from 4 to 20 mA. When the transmitter is coupled with a receiving instrument, the transmitter should operate with an electric power of about 50 mW or at 12 V with 4 mA in reality. With such a power requirement, the transmitters for laboratory use consume a moderate amount of power where the above correcting means is incorporated. However, those transmitters which are for sale on the market have many transmission wires, and require increased power consumption, so that they cannot find widespread use in actual applications. The known transmitting arrangement is relatively costly as it needs to be equipped with the differential-pressure transmitter, temperature transmitter and pressure transmitter. Correction in the receiving instrument is liable to be less accurate because of an accumulation of errors arising in the transmission via the transmission wires to the receiving instrument. The less accurate correction fails to achieve desired linearity between an actual differential pressure and a measured differential pressure, with the consequence that the differential pressure as measured will contain unwanted errors.

SUMMARY OF THE INVENTION

It is an object of the present invention to provide a process variable transmitter for correcting a process variable detected, with reduced electric power consumption, and for transmitting the corrected process variable over a two-wire transmission line system.

Another object of the present invention is to provide a single process variable transmitter in which a process variable to be measured can be corrected.

Still another object of the present invention is to provide a process variable transmitter capable of correcting to precision a primary process variable to be measured, where the primary process variable includes errors due to secondary process variables not to be measured, by periodically detecting in the process variable transmitter such other secondary process variables.

The above objects can be achieved by a process variable transmitter comprising a plurality of process variable detector units for detecting a primary process variable to be measured and secondary process variables not to be measured but which affect the primary process variable, a memory circuit for storing detected outputs supplied from the process variable detector units, a circuit for reading the detected outputs out of the memory circuit and then correcting the detected output indicative of the primary process variable based on the detected outputs indicative of the secondary process variables, and a power supply control for intermittently supplying electric power to the process variable detector units and the correcting circuit.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENT

Figure 1:
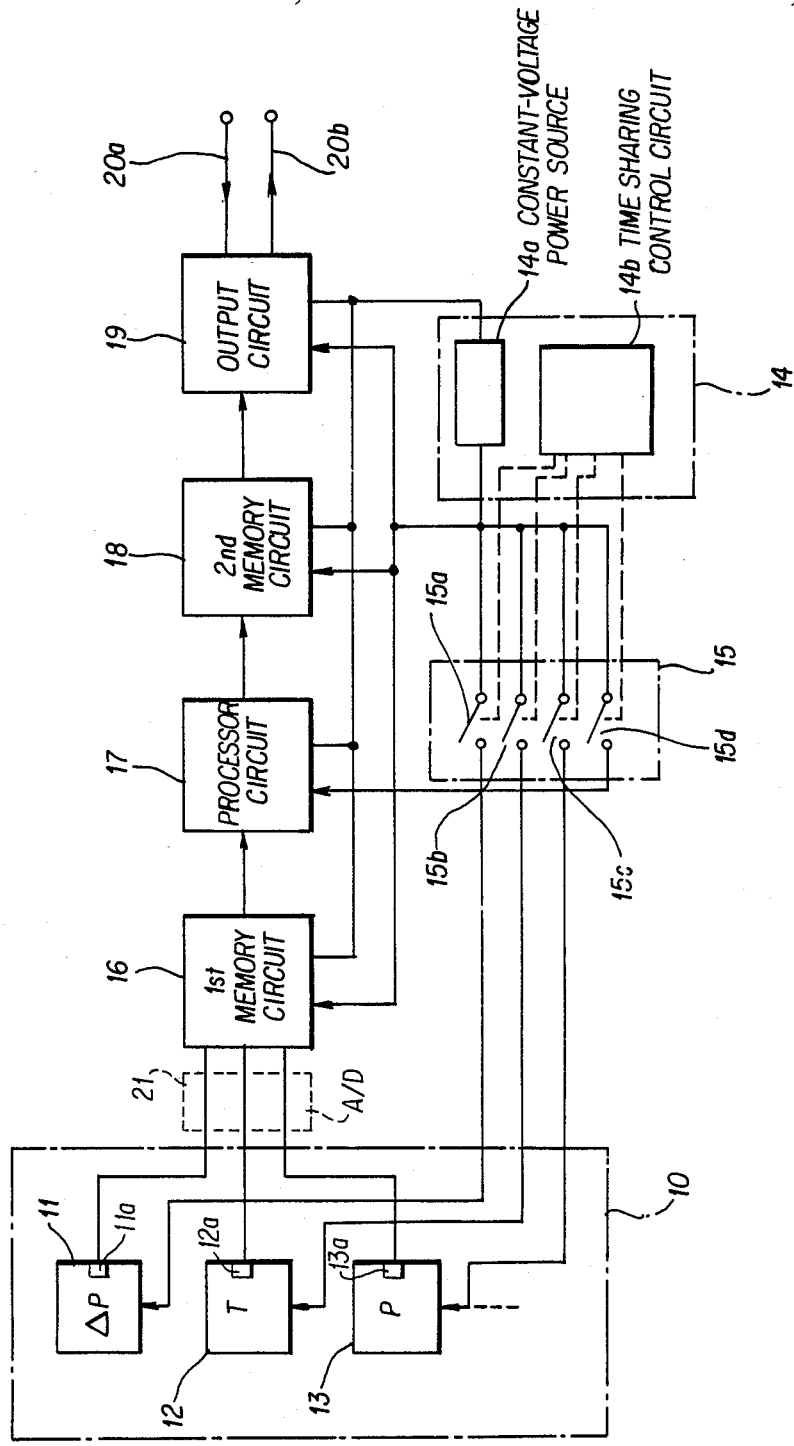
FIG. 1 is a block diagram of a process variable transmitter according to the present invention.

Referring now to the drawings, wherein like reference numerals designate identical or corresponding parts throughout the several views, and more particularly to FIG. 1 thereof, a process variable detector 10 includes a first detector unit 11 for detecting a primary process variable to be measured, such for example as a differential pressure ΔP, a second detector unit 12 for detecting a secondary process variable not to be measured such as a temperature T, and a third detector unit 13 for detecting another secondary process variable such as a static pressure. The first through third detector units 11–13 contain known A/D converters (11a–13a) for producing digital signal outputs.

The first through third detectors 11–13 are supplied with electric power on a time-sharing basis from a power supply control 14 through a switching circuit 15 to detect the process variables, and produce output signals which are written in a first memory circuit 16 such as a semiconductor memory which is composed of a CMOS RAM (Random Access Memory). The RAM for such a first memory circuit may comprise a RAM IM87C48 manufactured by Intersil Inc.

The output written in the first memory circuit 16 is read out for correction processing by a signal processor circuit 17 such as a microprocessor. The signal processor circuit 17 may for example be composed of an IM87C48 microprocessor manufactured by Intersil Inc.

The power supply control 14 includes a constant-voltage power source 14a and a time-sharing control circuit 14b. The power supply control 14 serves to supply DC power to the first memory circuit 16 at all times, and also to supply the detector units 11–13 and the signal processing circuit 17 with DC power on a time-sharing basis for successively closing and opening contacts 15a–15d in the switching circuit 15 under the control of the time-sharing control circuit 14b. The time-sharing control circuit 14b includes a known scanning circuit including a crystal oscillator circuit.

The process variable transmitter shown in FIG. 1 also includes a second memory circuit 18 such as a RAM composed of a semiconductor memory for storing a differential-pressure signal after it has been corrected. The differential-pressure signal stored in the second memory circuit 18 is converted by a subsequent output circuit 19 into a current signal, which is then delivered to a receiving instrument (not shown) over two transmission wires 20a, 20b. The second memory circuit 18 and the output circuit 19 are supplied at all times with a constant voltage from the power supply control 14.

Figure 2:
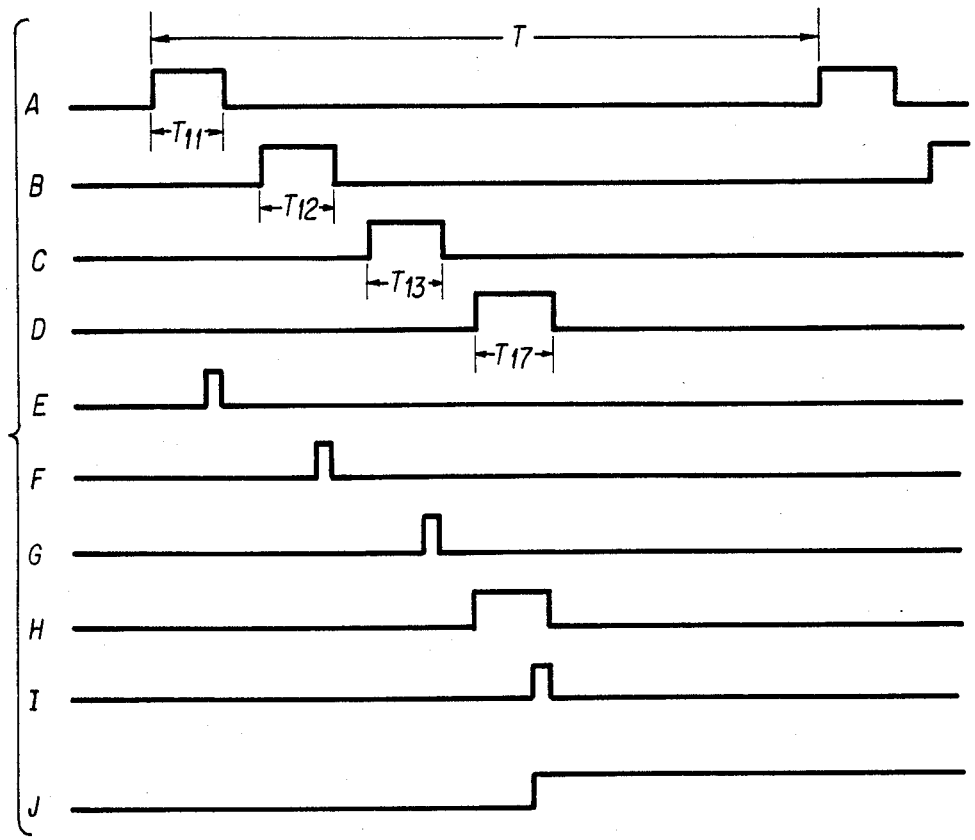
FIG. 2 is a timing chart illustrating operations of the process variable transmitter shown in FIG. 1.

Operation of the process variable control thus constructed will be described with reference to FIG. 2 which shows operation timing.

The detector units 11–13 and the signal processing circuit 17 are energized and de-energized according to timing patterns A through D, respectively. The detector units 11–13 as they are turned on produce outputs indicative of process variables detected, which are then written in the first memory circuit 16 according to timing patterns E through G, respectively. The signal processing circuit 17 reads the detected outputs out of the first memory circuit 16 at a timing H. The differential-pressure signal, i.e., the primary process variable to be measured, is corrected in the signal processing circuit 17, and then the corrected signal is written in the second memory circuit 18 at a timing I. The output circuit 19 produces an output current according to a timing pattern J which has a leading edge synchronous with the timing pulse I.

The first and second memory circuits 16, 18 are supplied at all times with a constant voltage from the constant-voltage power source 14a in the power supply control 14. The time-sharing control circuit 14b in the power supply control 14 firstly produces a signal to close the contact 15a to impress the constant voltage on the first detector unit 11 during an interval of time T11 as shown at A in FIG. 2. The first detector 11 then detects a digital signal indicative of a differential pressure $\Delta P$ which is a primary process variable to be measured including errors due to temperature and pressure. The detected signal from the first detector unit 11 is written in the first memory circuit 16 at the timing E in FIG. 2. After the primary differential-pressure signal has thus been detected, the power supply control 14 closes the contact 15b to apply the constant voltage to the second detector unit 12 during a time interval T12 as illustrated at B in FIG. 2. The second detector unit 12 is now enabled to detect a temperature signal T, which is written in the first memory circuit 16 at the timing F in FIG. 2. Likewise, the third detector unit 13 is supplied with the constant voltage from the power supply control 14 during a period of time T13 as shown at C in FIG. 2 for thereby detecting a pressure signal P, which is then written in the first memory circuit 16 at the timing G in FIG. 2. The differential-pressure signal $\Delta P$ which is the primary process variable to be measured and the temperature signal T and pressure signal P which are the secondary process variables not to be measured are thus stored in the first memory circuit 16.

Figure 3:
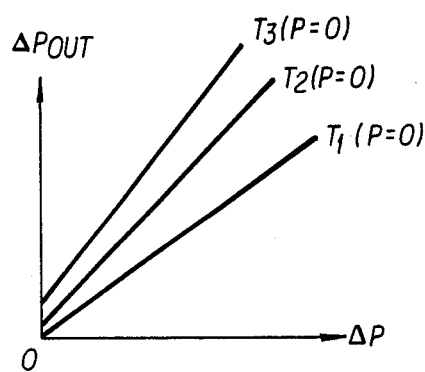
FIGS. 3 and 4 are graphs illustrative of the influence of secondary process variables on a primary process variable to measured.

Thereafter, the time-sharing control circuit 14b in the power supply control 14 produces a signal to close the switch 15d, thereby applying the constant voltage to the signal processing circuit 17 during an interval of time T17 as shown at D in FIG. 3. The signal processing circuit 17 is then enabled to read the three detected outputs out of the first memory circuit 16 during the time period of the pulse H which is substantially the same as the time interval T17, whereupon the signal processing circuit 17 processes the signals in order to remove the errors due to the temperature and pressure from the differential pressure. The differential-pressure signal after it has been corrected is written in the second memory circuit 18 at the timing I in FIG. 3, and at the same time is converted by the output circuit 19 into an output current, which is delivered over the transmission line 20b to the receiving instrument. The foregoing processing operation of the transmitter is repeated at a period of T. Since the electric circuit in the transmitter processes the signals much faster than normal changes in the process variables, no difficulty arises due to the above periodic or intermittent signal processing operation.

The signal processing circuit 17 effects two correcting operations. One is effected through an arithmetic operation to linearize the primary process variable, and the other is carried out by an arithmetic operation to remove any influences due to the secondary process variables detected by the temperature detector 12 and the pressure detector 13. These arithmetic operations are performed using the Lagrange's interpolation formula with respect to three variables.

Figure 4:
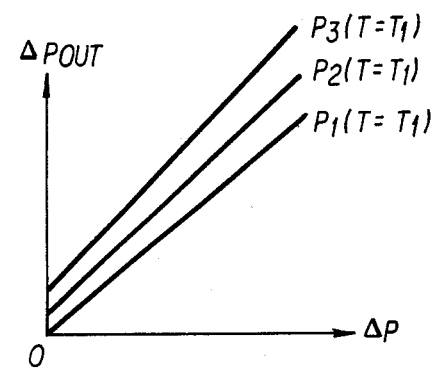

FIGS. 3 and 4 are illustrative of the manner in which the differential-pressure signal $\Delta p$ varies with the temperature and pressure. FIG. 3 shows correlations between an actual differential pressure $\Delta P$ and a detected output $\Delta Pout$ at a pressure of 0 pascal at different temperatures of T1 (100 degrees Celsius), T2 (25 degrees Celsius), and T3 (−40 degrees Celsius). FIG. 4 illustrates correlations between $\Delta P$ and $\Delta Pout$ at a constant temperature of 100 degrees Celsius at different pressures of P1 (0 pascal), P2 (10 pascal), and P3 (20 pascal). The signal processing circuit 17 functions to remove these adverse effects that the secondary process variables have on the detected differential-pressure signal.

With the above arrangement of the invention, the detector units 11–13 and the signal processing circuit 17 are energized on a time-sharing basis. The detector units 11–13 can therefore be powered by a single power supply, with the result that they consume a much smaller amount of electric power as compared with conventional transmitters. Since the signal processing operation is periodically repeated, the primary process variable can be corrected to precision by removing errors due to the secondary process variables which vary from time to time. The transmitter includes a plurality of different sensors for detecting process variables and other parts which can be shared by such sensors. Therefore, the transmitter is relatively simple in construction and inexpensive to manufacture. The signal indicative of the primary process variable to be measured can be transmitted over the two-wire transmitted system, as the signal is delivered after having been corrected.

The present invention is not limited to the illustrated embodiment, but changes or modifications may be made therein. For example, secondary process variables are selected dependent on a process variable being measured, though temperature and pressure are used therefor in the illustrated embodiment. Also, the switching circuit 15 is shown as including as many independent switch contacts 15a–15d as there are corresponding detector units 11–13 and signal processing circuit 17. However, the switching circuit 15 may comprise a single common movable contact, or be in the form of a semiconductor switching device.

As another modification, the detector units may be arranged to generate analog signals, which may be converted 21 (shown in dotted lines in FIG. 1) by a single A/D converter into digital signals before being stored into the first memory circuit. Such a single A/D converter 21 is supplied with a constant voltage through a separate switch added to the switching circuit. Alternatively, the first and second memory circuits may include analog memories, and the signal processing circuit may be arranged to perform an analog arithmetic operation on the signals from the first memory circuit to produce a corrected signal which is then stored in the second memory circuit. The signal produced from the second memory circuit may then be converted by an output circuit into a current for transmission.

With the present invention, therefore, the primary process variable to be measured, which includes errors due to the secondary process variables, can be corrected accurately as the secondary process variables are detected from time to time and used for correction of the primary process variable prior to the transmission. The transmitter can linearize the measured primary process variable which is normally nonlinear for producing a desired output or measured value. Since the detector units are energized in sequence on a time-sharing basis for their operation, the process variable transmitter consumes a reduced amount of electric power. The process variable transmitter of the invention is also advantageous in that it is less costly to construct and simpler in structure than the prior process variable transmitters.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process variable transmitter for transmitting a process variable to a receiving instrument at a location remote from said transmitter, comprising:
    a plurality of process variable detector units for detecting a primary process variable to be measured and for detecting secondary process variables which affect the primary process variable;
    a memory circuit for storing detected outputs supplied from the process variable detector units;
    processing means for reading the detected outputs of the memory circuit and then correcting the detected output indicative of the primary process variable based on the detected outputs indicative of the secondary process variables;
    means for converting the corrected detected output to an output current signal and for transmitting said current signal to said remote receiving instrument; and
    power supply control means for intermittently supplying electric power to the process variable detector units and the processing means.

2. The process variable transmitter of claim 1, wherein said detector units, said memory circuit, said processing means and said power supply control are in one enclosure.

3. The process variable transmitter of claim 1, comprising;
    said plurality of process variable detector units including respective analog-digital converters; and
    said memory circuit storing the digital outputs of said converters.

4. The process variable transmitter of claim 1, comprising:
    an analog-digital converter connected between said detector units and said memory circuit and controlled by said power supply to convert analog output from said detector units to digital outputs.

5. The process variable transmitter of claim 1, wherein said memory processing means and said circuit operate in an analog domain.

6. The process variable transmitter of claim 1, wherein said power supply control means comprises:
    a constant voltage power source for applying power to said converting means and for producing a current for powering said detector units, said memory circuit and said processing means.

7. The process variable transmitter of claim 6, said output current signal is from 4 mA through 20 mA, and said powering current is less than 4 mA.

* * * * *